United States Patent [19]

Engeler et al.

[11] 3,902,187

[45] Aug. 26, 1975

[54] SURFACE CHARGE STORAGE AND TRANSFER DEVICES

[75] Inventors: William E. Engeler, Scotia; Jerome J. Tiemann, Schenectady, both of N.Y.

[73] Assignee: General Electric Company, Schenectady, N.Y.

[22] Filed: July 2, 1973

[21] Appl. No.: 375,752

Related U.S. Application Data

[63] Continuation of Ser. No. 130,107, April 1, 1971, abandoned.

[52] U.S. Cl. ............... 357/24; 307/221 D; 307/304

[51] Int. Cl.²........................................ H01L 29/78

[58] Field of Search..... 317/235 C; 307/221 D, 304, 307/311; 357/24, 30; 250/211 J, 258; 178/7.1; 340/173

[56] References Cited

UNITED STATES PATENTS

| | | | |
|---|---|---|---|
| 3,621,283 | 11/1971 | Teer et al. | 307/221 D |
| 3,643,106 | 2/1972 | Berwin et al. | 317/235 |
| 3,651,349 | 3/1972 | Kahng et al. | 307/221 D |
| 3,676,715 | 7/1972 | Brojdo | 317/235 |
| 3,739,240 | 6/1973 | Krambeck | 317/235 |
| 3,745,383 | 7/1973 | Sangster | 307/221 D |
| 3,758,794 | 9/1973 | Kosonocky | 317/235 |
| 3,770,988 | 11/1973 | Engeler et al. | 317/235 |

OTHER PUBLICATIONS

Applied Physics Letters, "Charge Coupled 8–Bit Shift Register," by Tompsett et al., Vol. 17, No. 3, 1, Aug. 1970, pp. 111–115.

*Primary Examiner*—William D. Larkins
*Attorney, Agent, or Firm*—Julius J. Zaskalicky; Joseph T. Cohen; Jerome C. Squillaro

[57] ABSTRACT

A conductor-insulator-semiconductor (CIS) information storage device employing a semiconductor substrate of one-conductivity type with a surface-adjacent region of an opposite-conductivity type as the storage media is disclosed. Means are disclosed for storing information in the form of electrical charges in a plurality of charge storage regions electrically isolated from each other by non-conducting barrier regions. Electrical charges are transferred from one storage region to another by controllably removing the non-conducting barrier regions therebetween. Various means for storing and transferring electrical charges are disclosed.

9 Claims, 7 Drawing Figures

Inventors:
William E. Engeler,
Jerome J. Tiemann,
by Jerome C. Squillaro
Their Attorney.

Inventors:
William E. Engeler,
Jerome J. Tiemann,
by Jerome C. Squillaro
Their Attorney.

SURFACE CHARGE STORAGE AND TRANSFER DEVICES

This is a continuation of application Ser. No. 130,107, filed Apr. 1, 1971, now abandoned.

The present invention relates to semiconductor devices and more particularly to semiconductor surface charge devices employing a conducting channel of a conductivity type opposite to that of the bulk semiconductor material. This application is related to our copending applications Ser. No. 56,353 filed July 20, 1970, now abandoned (Ser. Nos. 69,649 now Pat. No. 3770988, and 69,651 now abandoned filed Sept. 4, 1970, and Ser. Nos. 84,665, 84,666 now abandoned, and 84,659 now abandoned, filed Oct. 28, 1970, all of common assignee as the instant invention and incorporated herein by reference thereto.

In our application Ser. No. 84,659, we disclose semiconductor surface charge transfer devices including a pair of spaced conductor members insulatingly disposed over a semiconductor substrate with a third conductor member insulatingly interposed between the adjacently spaced conductor members for storing and transferring electrical charges along the surface-adjacent portions of a semiconductor substrate of substantially one-conductivity type. In one embodiment of those devices, electrical charges are controllably transferred from one surface-adjacent storage region underlying one electrode to another surface-adjacent storage region underlying the other electrode by controlling the height of an electrical barrier between the two regions. The barrier height is controlled by the magnitude of the voltage applied to the interposed electrode. Numerous arrangements of these devices are disclosed for providing memory and logic functions, such as integration, storage, delay and digital and analog sorting. While devices constructed in accord with that invention have wide utility, certain device applications such as optical integrators and slow speed shift registers, for example, may require longer storage times than are obtainable in a one-conductivity-type substrate.

It is therefore a general object of this invention to provide improved semiconductor charge storage devices with increased storage times.

It is another object of this invention to provide surface charge transfer devices having improved lateral conductivity characteristics.

It is still another object of this invention to provide controlled transfer of electrical charge along the surface-adjacent regions of a semiconductor substrate by rendering portions of the surface-adjacent region nonconducting.

It is yet a further object of this invention to provide charge storage regions between two barrier regions and transfer charge from one storage region to another storage region by controlling the conduction characteristics of the barrier regions.

Briefly, in accord with one embodiment of our invention, these and other objects are achieved by providing a conductor-insulator-semiconductor (CIS) structure including at least one p-n junction formed by a surface-adjacent region of a conductivity type opposite that of the bulk semiconductor substrate material. The momentary application of a depletion region forming voltage to the conductor member insulatingly overlying the opposite-conductivity-type region produces an electrical charge storage region near the surface of the opposite-conductivity-type region. Electrical charges proportional to an information-bearing signal, for example, are introduced into the storage region by separate means. After the desired storage time, electrical readout of the stored charge is provided.

In accord with another aspect of our invention, means are provided for transferring electrical charges along the surface-adjacent portions of the semiconductor. One embodiment employs a plurality of adjacently spaced conductor members insulatingly disposed over a semiconductor substrate having a surface-adjacent region of opposite conductivity from the substrate. Electrical charges are stored in the surface-adjacent portions of the semiconductor underlying selected conductor members. Other selected conductor members provide means for forming electrical barrier regions in the semiconductor surface to control the transfer of electrical charge between the surface-adjacent portions. The storage and transfer of electrical charge along the surface-adjacent region of opposite conductivity eliminates or at least substantially reduces the generation of undesirable minority carriers at surface states and hence increases the charge storage time. Also, the increased conductivity characteristics of resultant devices permit higher rates of charge transfer.

The novel features believed characteristic of the present invention are set forth in the appended claims.

The invention itself, together with further objects and advantages thereof, may be best understood with reference to the following detailed description taken in connection with the accompanying drawing in which.

Figure 1:
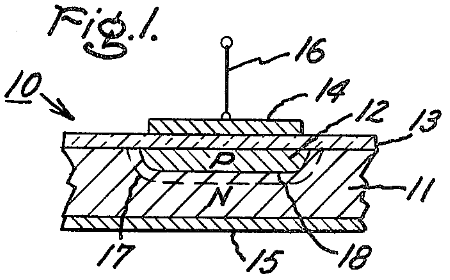
FIG. 1 is a partial cross-sectional view of a typical storage structure useful in practising our invention.

FIG. 1 is exemplary of a typical charge storage element 10 in accord with one embodiment of our present invention. The charge-storage element 10 includes a semiconductor substrate 11 of one-conductivity type, such as n-type silicon, for example, with a surface-adjacent opposite-conductivity-type p-region 12. The surface-adjacent p-type region 12 may be formed, for example, by diffusion or by epitaxial growth methods, well known to those skilled in the art.

The semiconductor substrate 11 with its opposite-conductivity-type region 12 is covered with an insulator layer 13 which may, for example, comprise any of the numerous insulator materials, such as silicon dioxide, silicon nitride, silicon oxynitride and aluminum oxide, for example. A conductor member 14 is disposed over the insulator layer 13 and preferably in substantial registry with the opposite-conductivity region 12. The conductor member 14 may advantageously be formed of materials such as molybdenum, tungsten, doped silicon or germanium or any of the numerous non-reactive, conducting and semiconducting materials capable of withstanding thermal stresses normally encountered in semiconductor fabrication processes.

A conductive contact 15 is applied to the opposite surface of the semiconductor substrate 11 to provide electrical contact to the substrate material. For example, this may be accomplished by alloying the semiconductor substrate material with gold, such as is commonly done in the semiconductor arts. Also, an electrical contact 16 is made to the conductor member 14, by suitable means, such as thermal compression bonding, soldering or through an extended interconnection of aluminum, for example, or other suitable material as is commonly used in integrated circuits.

The application of a negative voltage to the conductor member 14 relative to the substrate contact 15 of sufficient magnitude and commensurate with the thickness of the insulator layer 13 produces a depletion region 17 at the p-n junction 18, i.e., opposite-conductivity carriers are attracted to the surface of the opposite-conductivity-type region 12 by the momentary application of the voltage to the conductor member 14. For example, an insulator layer thickness of 1000 Angstroms (A) enables a voltage of approximately 10 volts to produce a depletion region at the p-n junction 18. Those skilled in the art can appreciate that thicker insulator layers require proportionately higher voltages.

Electrical charges in the form of opposite conductivity carriers are stored within the opposite conductivity type region 12 of the storage element 10. These opposite conductivity carriers, generally proportional to an information-bearing signal, are introduced into the depletion region 17 from a separate source, such as a point contact, another p-n junction, or through the generation of electron-hole pairs in the semiconductor bulk by electromagnetic radiation incident on the semiconductor bulk, for example. The presence of opposite conductivity carriers at the opposite-conductivity-type region 12 alters the charge on this region in proportion to the magnitude of the stored carriers. The change in charge is therefore a measure of the incident electromagnetic radiation, for example, making the storage device useful as an electromagnetic radiation flux integrator.

A particularly desirable characteristic of storing electrical charges at the depletion region of a p-n junction rather than in a surface depletion region in a semiconductor substrate of one-conductivity type is that longer storage times are achievable. This is achieved in accord with our invention by the elimination or at least substantial reduction of the electric field at the location of undesirable surface states. Whereas the storage times in a surface depletion region of a conductivity-type substrate are limited by the generation of electron-hole pairs at surface states at the semiconductor-insulator interface, our present invention eliminates or at least substantially reduces the rate of generation at these surface states by making the electric field at the surface under the storage electrode sufficiently small.

This characteristic feature of our invention is employed advantageously for optical integrators, for example, where "dark currents" are to be minimized. Also, applications where stored charges are transferred at low clock rates, such as a shift register operating at speeds of one transfer per second, for example.

Another advantageous characteristic of our invention is the increased lateral conductivity for surface charges. More specifically, we have discovered that the movement of electrical charges along the surface of a semiconductor substrate is enhanced by a region of opposite-conductivity type over a single-conductivity-type substrate. This increased conductivity permits higher rates of charge transfer and hence permits the fabrication of integrated circuit devices with higher operating frequencies.

Methods and apparatus for storing and transferring charges along the surface-adjacent regions of a semiconductor substrate may take various forms. Therefore, it is our intention to describe, by way of example, illustrative apparatus and methods for transferring charges along the surface-adjacent portions of a semiconductor substrate. It should be understood, however, that these illustrative examples are for purposes of better understanding how electrical charges are stored and transferred and are not to be construed as limiting the scope of our invention.

Figure 3:
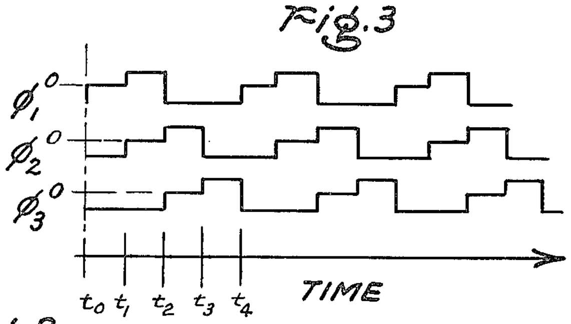
FIG. 3 illustrates typical voltage versus time waveforms associated with the operation of the embodiment of our invention illustrated in FIG. 2.
Figure 2:
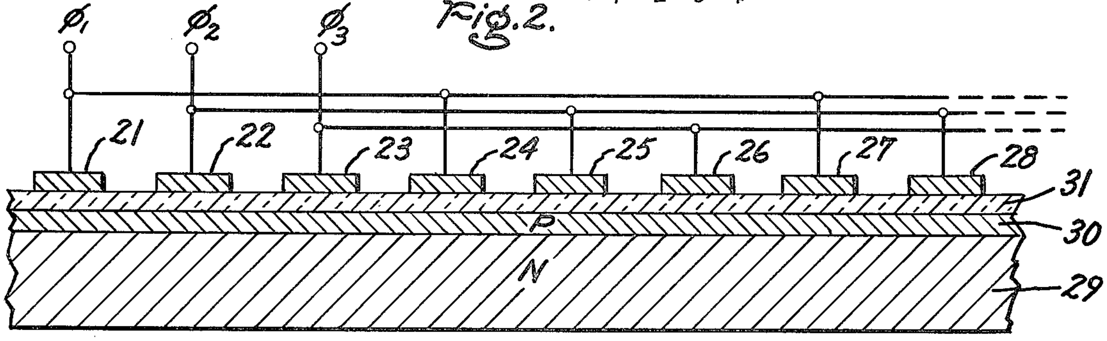
FIG. 2 is a partial cross-sectional view of an embodiment of our invention employing three-phase clocking signals for charge storage and transfer.

FIG. 2 illustrates a partial cross-sectional view of an embodiment of our invention wherein a plurality of conductor members 21 through 28 insulatingly disposed over a semiconductor substrate 29 such as n-type silicon, for example, with a surface-adjacent opposite conductivity p-type region 30. The conductor members 21 through 28 are insulated from the surface of the opposite type conductivity region 30 by an insulator layer 31. Conductor members 21, 24 and each succeeding third electrode are connected in common to one phase of a three-phase clocking system. As illustrated, conductor members 21 and 24 are connected to $\phi_1$, conductor members 22 and 25 and every third conductor member thereafter are connected to $\phi_2$ and conductor members 23, 26 and every third conductor member thereafter are connected to $\phi_3$. FIG. 3 is illustrative of typical three-phase clocking signals $\phi_1$, $\phi_2$ and $\phi_3$ suitable for storing and transferring charges along the surface-adjacent region 30 of the semiconductor substrate 29.

Electrical charges, introduced into the semiconductor substrate in a manner described above, for example, are transferred sequentially along the surface-adjacent region of the semiconductor substrate with each succeeding clock pulse. For example, if electrical charges are stored at the surface-adjacent portions of the p-type region 30 underlying electrodes 21 and 24, for example, these charges are transferred to a similar region underlying electrodes 22 and 25 during the time period $t_0$ to $t_1$. These charges are in turn transferred to similar regions underlying electrodes 23 and 26 between times $t_1$ and $t_2$ and then again to storage regions underlying 24 and 27, respectively, between times $t_2$ and $t_3$. The transfer of charge takes place when the barrier region underlying the next adjacent storage region is removed and a depletion region is formed thereunder. This change from a barrier to a depletion region occurs when the clocking pulse changes from a positive to a negative potential. FIG. 3 illustrates these changes for the transfer of charge described above.

Those skilled in the art can readily appreciate that the three-phase clocking system provides charge storage regions which are located between two nonconducting regions so that the charge stored therein is not lost to the semiconductor substrate. Only during the transfer times are two adjacent storage regions permitted to transfer charge. Immediately thereafter, the barrier is again replaced and charge is stored in the new storage region. Three adjacent storage regions are required for the storage and transfer of a single bit of information in the embodiment illustrated in FIG. 2. This is necessitated by the fact that in addition to its present location, each charge must have a vacant storage region ahead of it to which it is transferred, and a region behind it which functions as a barrier so that charge is not transferred in the wrong direction.

Figure 4:
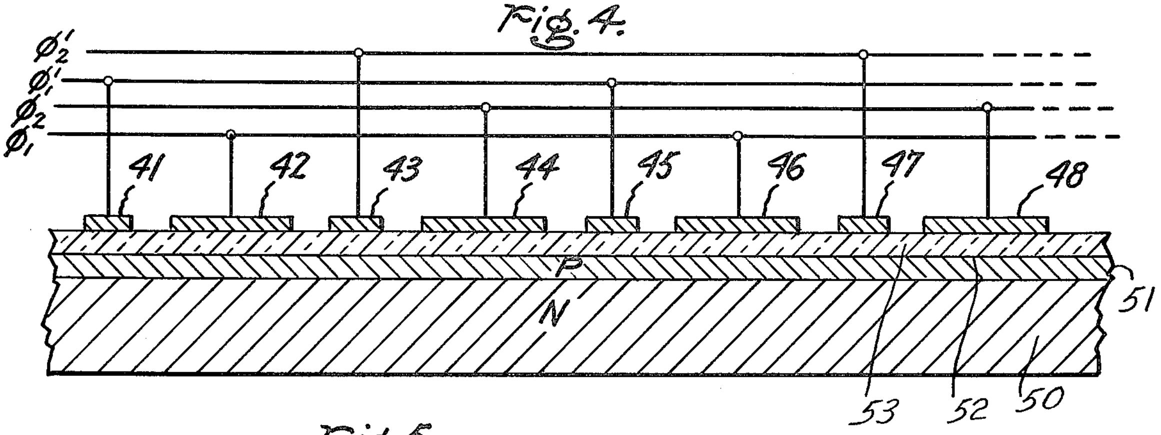
FIG. 4 illustrates a partial cross-sectional view of another embodiment of our invention employing two-phase clocking signals for charge storage and transfer.

FIG. 4 illustrates another embodiment of our invention wherein a two-phase clocking system is employed to transfer charge. By way of example, FIG. 4 illustrates a plurality of conductor members 41 through 48 insulatingly disposed over a semiconductor substrate 50 of n-type silicon, for example. The substrate 50 is provided with a surface-adjacent region 51 of opposite conductivity to that of the substrate 50 and forming a p-n junction 52 therebetween. The plurality of conductor members 41 through 48 are insulated from the p-type surface 51 by an insulator layer 53.

Figure 5:
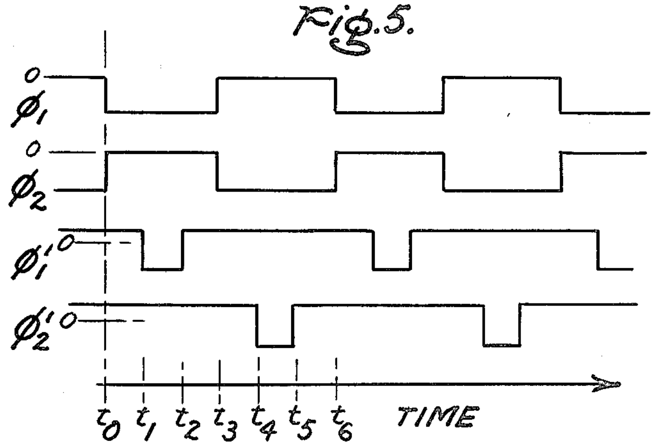
FIG. 5 illustrates typical voltage versus time waveforms associated with the operation of the embodiment of our invention illustrated in FIG. 4.

The plurality of conductor members 41 through 48 are illustrated as comprising two different size conductors. However, the difference in size is merely for descriptive purposes and for the sake of clarity, but is not to be construed as a limitation on our invention. Basically, conductors 42, 44, 46 and 48 provide the storage function and conductor members 41, 43, 45 and 47 provide a means for forming a channel blocking region or barrier between adjacently spaced storage regions substantially underlying the adjacent conductor members. The storage and transfer of charge along the surface-adjacent region of the semiconductor substrate is described with reference to the clocking signals illustrated in FIG. 5 which illustrates clocking pulses $\phi_1$ and $\phi_2$ as occurring substantially 180° out of phase with each other. $\phi_1$ and $\phi_2$ are applied to the electrodes 42, 44, 46 and 48 as illustrated in the drawing. Clocking signals $\phi_1'$ and $\phi_2'$ are connected to the conductor members 41, 43, 45 and 47 as illustrated in the drawing.

Operationally, electrical charges are stored in the surface-adjacent portions of the semiconductor substrate underlying conductor members 42, 44, 46 and 48. The intermediate regions, under the influence of voltages applied to conductor members 41, 43, 45 and 47 either block or permit charge transfer to the next adjacent storage region, depending upon the applied voltage signal. For example, assume that an electrical charge is stored in the surface-adjacent region underlying conductor member 44 and that it is desired to transfer this charge to a storage region underlying conductor member 46. At time $t_0$, the charge within the storage region underlying conductor member 44 is at a higher potential than the storage region underlying conductor member 46. This is a result of the clocking signals applied to these conductor members. At this time, however, the voltage $\phi_1'$ applied to conductor member 45 causes a blocking condition to exist between the two storage regions and hence no charge is transferred. At time $t_1$, however, the voltage $\phi_1'$ changes from a voltage which produces a blocking condition to one which produces a charge conduction condition. Therefore, during the period $t_1$ to $t_2$ charge is transferred from the storage region underlying conductor member 44 to the storage region underlying conductor member 46. After time $t_2$, the barrier condition again exists and the charge within the storage region underlying conductor member 46 is isolated from other portions of the substrate. At time $t_3$, the surface potentials underlying conductor members 44 and 46 are altered such that the charge underlying conductor member 46 is now ready to be transferred to the storage region underlying conductor member 48. This transfer occurs at time $t_4$ when the barrier underlying conductor member 47 is removed and a conduction path provided between the storage region underlying conductor member 46 and storage region underlying conductor member 48. In this way, electrical charges are transferred along the surface-adjacent regions of the semiconductor substrate.

One major advantage of the embodiment illustrated in FIG. 4 is that only two storage regions are required per bit of information. As a result, higher density storage and transfer devices can be fabricated. Additionally, the closer spacing between adjacent storage regions permits increased rates of charge transfer and also the efficiency of charge transfer so that resultant devices, such as shift registers, for example, can be operated at higher frequencies and with a larger number of storage elements before the transferred charges must be regenerated in amplitude.

Figure 6:
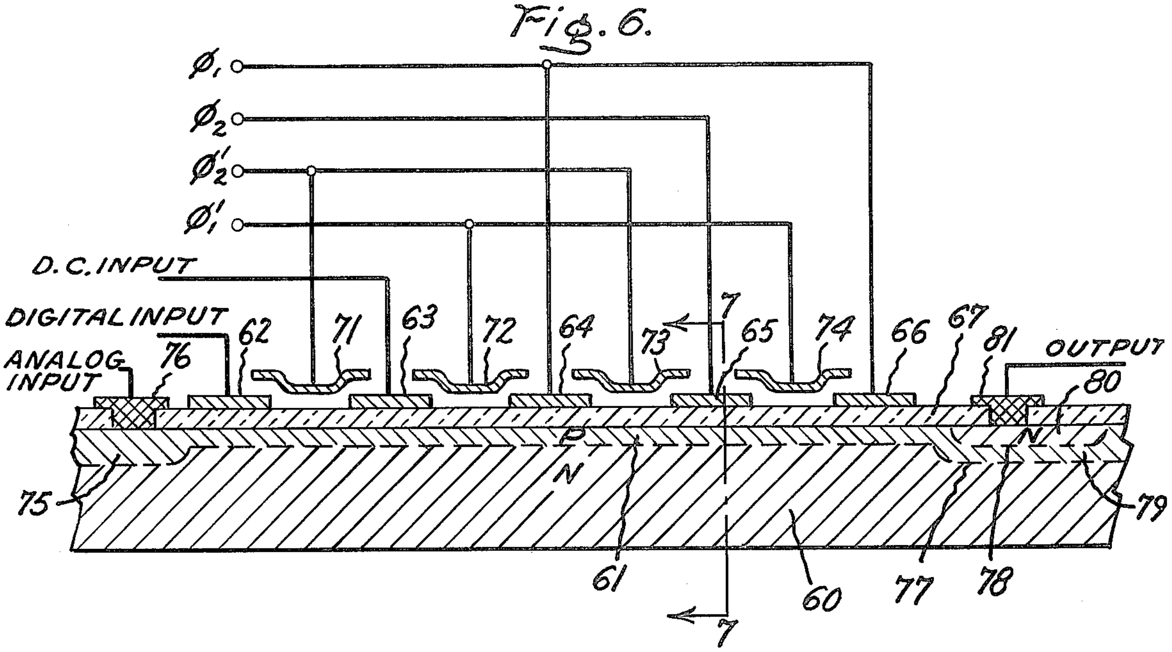
FIG. 6 illustrates a partial cross-sectional view of still another embodiment of our invention employing overlapping conductor members with a charge-receive device exhibiting voltage gain.

FIG. 6 illustrates yet another embodiment of our invention wherein a semiconductor substrate 60 of one-conductivity type includes a surface-adjacent region 61 of opposite-conductivity type. For example, the substrate 60 may be of n-type conductivity with a p-type surface-adjacent region. In this embodiment of our invention, the conductor members are insulatingly disposed in overlapping relation with each other and the semiconductor substrate. More specifically, FIG. 6 illustrates a plurality of conductor members 62 through 66 overlying the surface-adjacent region 61 and separated therefrom by an insulator layer 67. A second plurality of conductor members 71 through 74 insulatingly overlie the first plurality of conductor members and overlap adjacently spaced conductor members of the first plurality. FIG. 6 also illustrates means for injecting or introducing charge into the surface-adjacent region 61 and means for removing charge therefrom. For example, FIG. 6 illustrates a p-n junction 75 with contact made to the p-type region with an electrode 76 for introducing charge into the surface-adjacent region 61. The charge-receive device is illustrated as comprising a first p-n junction 77 formed with the n-type substrate 60 and a second p-n junction 78 formed within the p-type region 79 by the formation of an n-type region 80. An electrical contact 81 is made to the n-type region 80 so that an electrical signal proportional to the transferred charge is provided as an output signal.

Electrical charges are transferred along the surface-adjacent p-type region 61 in substantially the same manner as described above with reference to FIG. 4. Clocking signals substantially similar to those illustrated in FIG. 5, for example, are connected to the conductor members 62 through 66 and 71 through 74 in the manner illustrated in the drawing. In this embodiment, since the conductor members 71 through 74 are at a greater distance from the surface-adjacent region of the semiconductor substrate, larger amplitude voltage signals are required to form the barrier regions between the adjacently spaced storage regions. However, for insulator layer thicknesses of the order of 1000 to 2000 A, only a few volts additional amplitude are required.

A particularly desirable characteristic of the embodiment of our invention illustrated in FIG. 6 is the voltage gain provided by the charge-receive device. Voltage gain is provided by the transfer of charge to the forwardly biased p-n junction 78 which functions in a manner substantially similar to the base emitter junction of an N-P-N bipolar transistor. A negative bias voltage applied to the electrode 81 relative to the p-type region 79 causes the injected charge to be amplified by the forward current gain, beta, of the transistor. Alternately, the receive device could be operated without the n-type region 80 and utilize only the p-n junction 77. This configuration, however, does not provide current gain for the received charge. A more detailed discussion of charge launch and receive devices and methods for making the same are described in the aforementioned application Ser. No. 69,649.

Figure 7:
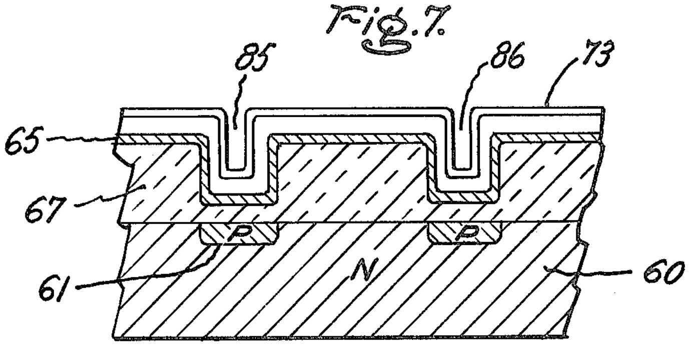
FIG. 7 is a cross-sectional view taken along the lines 7—7 of FIG. 6.

FIG. 7 illustrates a partial cross-sectional view of the embodiment of our invention illustrated in FIG. 6 taken along the lines 7—7. As illustrated, the p-type region 61 underlies a narrow thickness of insulator layer 67 with greater thicknesses elsewhere. The thicker regions of the insulator layer 67 provide electrical isolation for the semiconductor substrate from the clocking signals being carried by the conductor members 65 and 73, for example. In the regions of the thin oxide, the clocking pulses either inhibit or permit charge transfer in a manner described above. However, in regions of the thicker oxide, the clocking pulses have no effect on the surface-adjacent region of the semiconductor substrate. FIG. 7 also illustrates adjacently spaced charge transfer channels 85 and 86 utilizing the common conductor members 65 and 73, for example, to effect charge transfer in both channels. Those skilled in the art can readily appreciate that still other adjacent charge storage and transfer channels may be employed if desired. Various methods and apparatus for providing high density arrays of storage elements are described in our copending applications Ser. Nos. 56,353, 69,651 and 84,666.

Those skilled in the art can reaily appreciate that although our invention is described with reference to certain specific embodiments, various changes and modificications may be made thereto without departing from the spirit and scope thereof. For example, whereas our invention has been described with reference to a semiconductor substrate of silicon material, other semiconductor materials, such as germanium, Group III–V and II–VI semiconductor compounds, such as cadmium sulfide, gallium arsenide and indium antimonide, may be employed and other useful insulator materials, different from those described above, may also be employed if desired. Further, p-type conductivity substrates with n-type surface layers may be employed, if desired. Additionally, various methods for making semiconductor devices in accord with our invention are contemplated. For example, the semiconductor technology relating to the fabrication of field-effect transistors may be advantageously employed if desired. Of particular value is the method for making self-registered field-effect transistors more fully described in commonly assigned copending patent applications Ser. Nos. 675,227 filed Oct. 13, 1967, now abandoned, and U.S. Pat. No. 3,566,517, and incorporated herein by reference thereto. The process technology described therein is compatible with the surface charge transfer devices of our present invention.

In summary, we have disclosed new and novel apparatus for storing and transferring electrical charges along the surface-adjacent regions of a semiconductor substrate. The use of a surface-adjacent region of opposite conductivity from that of the substrate provides charge storage devices with increased storage times and increased lateral conductivity characteristics, hence higher rates of charge transfer are possible.

In view of the foregoing, it is apparent that many modifications and changes may be made to our invention without departing from the spirit and scope thereof. Accordingly, we intend, by the appended claims to cover all such modifications and changes as fall within the true spirit and scope of our present invention.

What is claimed as new and desired to be secured by Letters Patent of the United States is:

1. In combination a substrate of one conductivity type semiconductor material with a surface adjacent portion including a thin continuous channel region of opposite conductivity type of substantially uniform depth and having substantially uniform net dopant concentration along its length, an insulator layer overlying said surface adjacent portion, a plurality of conductor members overlying said insulator layer and said region of opposite conductivity type and spaced along the length of said channel region, biasing means for applying phase related voltages to said conductor members in relation to said substrate to form a plurality of charge storage regions for opposite conductivity carriers in said channel region, means for introducing charge of opposite conductivity carriers representing a signal into one of said charge storage regions, said phase related voltages applied to said conductor members incrementally moving charge of opposite conductivity carriers from storage region to storage region along said channel, means for removing charge of opposite conductivity carriers from another one of said charge storage regions.

2. The combination of claim 1 in which said spaced conductor members are formed into a first and second group, each conductor member of said second group is spaced between respective adjacently spaced conductor members of said first group, and in which said biasing means includes a first pair of phase related voltages applied to said first group of conductor members to form a plurality of charge storage regions thereunder and also includes a second pair of phase related voltages applied to said second group of conductor members to form a plurality of non-conducting barrier regions thereunder, each pair of adjacent storage regions being separated by a respective barrier region.

3. The combination of claim 2 including means for rendering adjacent barrier regions alternately conductive whereby electrical charges are transferred along said channel region of opposite conductivity from storage region to storage region.

4. The combination of claim 1 in which said spaced conductor members are formed into a first, second and third group of conductor members, each third succeeding conductor member included in a respective group, and in which said biasing means includes first, second and third phase related voltages applied to said first, second and third group of conductor members respectively to incrementally move charge along said channel region of opposite conductivity type.

5. The combination of claim 1 in which said biasing means reversely biases the PN junction between said substrate of one conductivity type and said channel region of opposite conductivity type.

6. The combination of claim 1 in which said means for introducing charge into said one storage region includes a variable bias means for controlling the potential of a zone of said channel region of opposite conductivity type adjacent said one storage region.

7. The combination of claim 1 in which said means for removing charge from said one storage region includes bias means for controlling the potential of a zone of said channel region of opposite conductivity type adjacent said other storage region.

8. The combination of claim 1 in which said spaced conductor members are formed into a first, second, third and fourth group of conductors, each fourth succeeding conductor member included in a respective group, and in which said biasing means includes first, second, third and fourth phase related voltages applied to said first, second, third and fourth group of conductor members respectively to incrementally move charge along said channel region of opposite conductivity type.

9. In combination, a substrate on one conductivity type semiconductor material with a surface adjacent portion including a continuous channel region of opposite conductivity type, an insulator layer overlying said surface adjacent portion, a plurality of conductor members overlying said insulator layer and said channel region of opposite conductivity type and spaced along the length of said channel region, means for biasing said conductor members in relation to said substrate and in relation to said channel region of opposite conductivity type to form a plurality of charge storage regions for opposite conductivity carriers in said channel region of opposite conductivity type, a second region of said one conductivity type lying within said channel region of opposite conductivity type to form a transistor in which said second region is the emitter, said channel region of opposite conductivity type forming a PN junction with said second region is the base and said substrate is the collector, means for applying a voltage in circuit with said second region and said substrate to forwardly bias said second region of one conductivity with respect to said channel region of opposite conductivity type and to reversely bias said channel region of opposite conductivity type with respect to said substrate, means for conducting charge introduced into said one storage region along said channel region of opposite conductivity type into the base of said transistor, means connected in circuit with said second region of one conductivity type and said substrate for sensing the current flow in said transistor in response to the flow of said charge.

* * * * *